(12) United States Patent
Baldemair et al.

(10) Patent No.: US 11,296,853 B2
(45) Date of Patent: Apr. 5, 2022

(54) SIGNALING FOR RADIO ACCESS NETWORKS

(71) Applicant: Telefonaktiebolaget LM Ericsson (publ), Stockholm (SE)

(72) Inventors: Robert Baldemair, Solna (SE); Daniel Chen Larsson, Lund (SE); Erik Dahlman, Stockholm (SE); Sorour Falahati, Stockholm (SE); Stefan Parkvall, Bromma (SE)

(73) Assignee: Telefonaktiebolaset LM Ericsson (Publ), Stockholm (SE)

( * ) Notice: Subject to any disclaimer, the term of this patent is extended or adjusted under 35 U.S.C. 154(b) by 126 days.

(21) Appl. No.: 16/607,436

(22) PCT Filed: May 5, 2017

(86) PCT No.: PCT/SE2017/050449
§ 371 (c)(1),
(2) Date: Oct. 23, 2019

(87) PCT Pub. No.: WO2018/203782
PCT Pub. Date: Nov. 8, 2018

(65) Prior Publication Data
US 2020/0136789 A1    Apr. 30, 2020

(51) Int. Cl.
*H04W 72/04* (2009.01)
*H04L 5/00* (2006.01)
*H04W 72/12* (2009.01)

(52) U.S. Cl.
CPC ............ *H04L 5/0078* (2013.01); *H04L 5/001* (2013.01); *H04L 5/0053* (2013.01); *H04W 72/042* (2013.01); *H04W 72/1268* (2013.01)

(58) Field of Classification Search
CPC . H04W 72/04; H04W 72/12; H04W 72/0413; H04W 2/0453; H04W 72/1284; H04W 72/0446
See application file for complete search history.

(56) References Cited

U.S. PATENT DOCUMENTS

| 2013/0128854 A1* | 5/2013 | Nakashima | ............ | H04L 1/1861 370/329 |
| 2017/0280479 A1* | 9/2017 | Frenne | .................... | H04L 5/001 |

OTHER PUBLICATIONS

International Search Report and Written Opinion dated Jan. 24, 2018 for International Application No. PCT/SE2017/050449 filed on May 5, 2017, consisting of 11-pages.
3GPP TSG RAN WG1 Meeting #88 R1-1702785; Title: sPUCCH resource management; Source: NTT DaCOMa, Inc.; Agenda Item: 7.2.5.2.3.2; Document for: Discussion and Decision; Location and Date: Athens, Greece Feb. 13-17, 2017, consisting of 2-pages.

(Continued)

*Primary Examiner* — Anez C Ebrahim
(74) *Attorney, Agent, or Firm* — Christopher & Weisberg, P.A.

(57) ABSTRACT

The disclosure pertains to a method of operating a user equipment in a Radio Access Network. The method includes transmitting signaling in a first transmission timing structure starting at a starting symbol, the starting symbol being determined based on a received transmission timing structure indication, the transmission timing structure indication indicating the first transmission timing structure. The disclosure also pertains to related methods and devices.

16 Claims, 2 Drawing Sheets

(56) References Cited

OTHER PUBLICATIONS

3GPP TSG RAN WG1 Meeting #88bis R1-1704643; Title: sPUCCH resource management; Source: ZTE, ZTE Microelectronics; Agenda Item: 7.2.1.2.3.2; Document for: Discussion and Decision; Location and Date: Spokane, USA Apr. 3-7, 2017, consisting of 8-pages.

3GPP TSG RAN WG1 Meeting #88bis R1-1705468; Title: Discussion on sPUCCH resource management; Source: LG Electronics; Agenda Item: 7.2.1.2.3.2; Document for: Discussion and Decision; Location and Date: Spokane, USA Apr. 3-7, 2017, consisting of 3-pages.

3GPP TSG-RAN WG1 #86 bis R1-1610327; Title: sPUSCH sTTI operation; Source: Ericsson; Agenda Item: 7.2.10.2.1; Document for: Discussion, Decision; Location and Date: Lisbon, Portugal Oct. 10-14, 2016, consisting of 5-pages.

3GPP TSG RAN WG1 Meeting #87 R1-1611167; Title: Processing time reduction and related procedures for short TTI; Source: Huawei, HiSilicon; Agenda Item: 6.2.10.2.6; Document for: Discussion and decision; Location and Date: Reno, USA Nov. 14-18, 2016, consisting of 8-pages.

\* cited by examiner

SIGNALING FOR RADIO ACCESS NETWORKS

CROSS-REFERENCE TO RELATED APPLICATIONS

This application is a Submission Under 35 U.S.C. § 371 for U.S. National Stage Patent Application of International Application Number: PCT/SE2017/050449, filed May 5, 2019 entitled "SIGNALING FOR RADIO ACCESS NETWORKS," the entirety of which is incorporated herein by reference.

TECHNICAL FIELD

The present disclosure pertains to wireless communication technology, in particular in the context of control signaling.

BACKGROUND

Modern communication technology, in particular technology of the 5th Generation (5G) aims at servicing a large variety of use cases and applications, and provides a high level of flexibility for communication and signaling. However, flexibility usually introduces significant signaling overhead.

SUMMARY

It is an object of the present disclosure to provide approaches allowing flexibility with limited overhead, in particular in the context of control signaling. The approaches described herein are particularly suitable for a Radio Access Network (RAN), in particular a 5G RAN like New Radio (NR) or LTE Evolution according to 3GPP (3rd Generation Partnership Project, a telecommunications standardization organization).

There is disclosed a method of operating a user equipment in a Radio Access Network. The method comprises transmitting signaling in a first transmission timing structure starting at a starting symbol, the starting symbol being determined based on a received transmission timing structure indication. The transmission timing structure indication indicates the first transmission timing structure.

Moreover, alternatively, or additionally, a (second) method of operating a user equipment in a Radio Access Network is described. The method comprises determining a border symbol indicating a border of a transmission scheduled in a first transmission timing structure. The border symbol is determined based on a received transmission timing structure indication, the transmission timing structure indication indicating the first transmission timing structure. The method also comprises transmitting or receiving signaling based on the determined border symbol.

A user equipment for a Radio Access Network may be considered. The user equipment is adapted for transmitting signaling in a first transmission timing structure starting at a starting symbol. The starting symbol is determined based on a received transmission timing structure indication, the transmission timing structure indication indicating the first transmission timing structure. The user equipment may comprise, and/or be adapted for utilising, processing circuitry and/or radio circuitry, e.g. a transmitter and/or transceiver, for such transmitting. Alternatively, or additionally, the user equipment may comprise a transmitting module for such transmitting.

Alternatively, or additionally, a (second) user equipment for a Radio Access Network may be considered. The user equipment is adapted for determining a border symbol indicating a border of a transmission scheduled in a first transmission timing structure, the border symbol being determined based on a received transmission timing structure indication. The transmission timing structure indication indicates the first transmission timing structure. The user equipment is further adapted for transmitting or receiving signaling based on the determined border symbol. The user equipment may comprise, and/or be adapted for utilising, processing circuitry and/or radio circuitry, e.g. a transmitter and/or transceiver and/or receiver, for such determining and/or transmitting and/or receiving. Alternatively, or additionally, the user equipment may comprise a determining module for such determining, and/or a transmitting module for such transmitting, and/or a receiving module for such receiving.

Generally, a user equipment may comprise, and/or be adapted for utilising, processing circuitry and/or radio circuitry, e.g. a receiver or transceiver, for receiving the transmission timing structure indication. The circuitry/ies may be the same as mentioned above, used for more than one functionality. The indication may be included in signaling, e.g. control signaling, which may be received signaling. Received signaling may generally be downlink signaling, or in some cases sidelink signaling.

Moreover, a method of operating a radio node in a Radio Access Network is discussed. The method comprises transmitting control signaling to a user equipment, the control signaling comprising a transmission timing structure indication. The method also comprises receiving, from the user equipment, signaling transmitted in a first transmission timing structure starting at a starting symbol based on a transmission timing structure indication, the transmission timing structure indication indicating the first transmission timing structure.

A radio node for a Radio Access Network is also described. The radio node is adapted for transmitting control signaling to a user equipment, the control signaling comprising a transmission timing structure indication. The radio node is also adapted for receiving, from the user equipment, signaling transmitted in a first transmission timing structure starting at a starting symbol based on a transmission timing structure indication, the transmission timing structure indication indicating the first transmission timing structure. The radio node may comprise, and/or be adapted for utilising, processing circuitry and/or radio circuitry, in particular a transmitter and/or transceiver and/or receiver, for such transmitting and/or receiving. Alternatively, or additionally, the radio node may comprise a transmitting module for such transmitting and/or a receiving module for such receiving.

Transmitting the control signaling comprising the indication may be considered configuring the user equipment. Receiving signaling starting at the starting symbol may comprise expecting the transmission based on the starting symbol, e.g. considering signaling traveling time.

The control signaling may be downlink control signaling or in same case sidelink control signaling, e.g. on an associated control channel. Receiving signaling based on a border symbol, in particular an ending symbol, may comprise expecting and/or interpreting the signaling to end at the symbol, and/or switching circuitry from receiving to transmitting.

According to the approaches described herein, a border symbol of scheduled transmission, e.g. a starting symbol or ending symbol, may be determined based on a transmission timing structure indication. No additional overhead is required to specifically indicate the border symbol. This may be particularly useful in the context of the border symbol being in the same transmission timing structure in which the indication is received. The approaches in particular allow to take into account processing time required before transmitting may be performed, e.g. by determining a starting symbol to be late enough in the timing structure to allow for processing, or by ending the reception in the timing structure early enough. The border symbol may be determined differ for differing timing distances between the transmission timing structure of reception of the transmission timing structure indication and the first transmission timing structure.

In some variants, the transmission timing structure indication may schedule the indicated transmission timing structure, e.g. for receiving signaling, and/or for transmitting signaling. The transmitting signaling may be scheduled after, and/or in response to, signaling scheduled for receiving.

The transmission timing structure indication may be at the beginning of a transmission timing structure it is transmitted in. It may generally be considered that the transmission timing structure indication is a slot indication, indicating a slot (or mini-slot) for transmitting or receiving. Accordingly, the first transmission timing structure may be such a slot or mini-slot.

Generally, if the first transmission timing structure is the transmission timing structure of reception of the transmission timing structure indication, the border symbol, in particular a starting symbol and/or ending symbol may be determined considering a processing timing. A processing timing may generally be based on capabilities of the radio node or user equipment, which may be signaled to the network or network node, or generally to the radio node transmitting the transmission timing structure indication. The processing timing may be determined based on a signaling travelling time, e.g. a timing advance value, and/or processing time for packaging and/or modulating and/or encoding data for transmission. If the data is to be transmitted in response to received signaling, the processing time may be considered to include time for decoding and/or demodulating and/or evaluation received signaling, e.g. to determine associated acknowledgment information, and/or for switching circuitry form receiving to transmitting. Processing timing may be considered by shifting an ending symbol to an earlier symbol, or a starting symbol to a later symbol (corresponding to a smaller symbol number or a larger symbol number, e.g. in one transmission timing structure). Processing timing may be specific to a radio nod, e.g. like a UE or terminal, and/or may be signaled or indicated or configured to the radio node, e.g. by the network or network node. The processing timing may be represented by a symbol number or shift. Different UEs or terminals may have associated to them different processing timings. Processing timing may be indicated and/or configured semi-statically or statically, e.g. by RRC layer signaling. Such processing timing may disregard signal traveling time, which may be configured more dynamically.

A starting symbol for signaling in response to received signaling (e.g., acknowledgement signaling) may be later in time than a starting symbol for signaling not in response, e.g. data signaling, which may in particular be PUSCH signaling. This may be in particular for cases in which the transmitting of signaling is indicated and/or scheduled for the transmission timing structure of reception of the transmission timing structure indication.

A border symbol may generally indicate a border of a scheduled transmission in time, and/or within a transmission timing structure. A transmission timing structure may comprise a plurality of symbols, and/or define an interval comprising several symbols (respectively their associated time intervals). In the context of this disclosure it should be noted that a reference to a symbol may be interpreted to refer to the time domain projection or interval or component of the symbol, unless it is clear from the context that the frequency domain component also has to be considered.

If the first transmission timing structure is the transmission timing structure of reception of the transmission timing structure indication, the starting symbol may be determined to be of a higher symbol number than if the first transmission timing structure is a transmission timing structure following the first transmission timing structure in time. Alternatively, or additionally, an ending symbol may be determined to be of a lower symbol number than if the first transmission timing structure is a transmission timing structure following the first transmission timing structure in time.

A transmission timing structure may generally comprise a plurality of symbols defining the time domain extension of the transmission timing structure, and arranged neighboring to each other in a numbered sequence. A timing structure or synchronisation structure may be defined by a succession of such transmission timing structures, which may for example define a timing grid with symbols representing the smallest grid structures. The first transmission timing structure, and/or a border symbol, in particular a starting symbol, may be determined or scheduled in relation to such a timing grid. A scheduled starting symbol may be considered a determined starting symbol. A transmission timing structure of reception may be the transmission timing structure in which the transmission timing structure indication is received, e.g. in relation to the timing grid.

It may in particular be considered that the first transmission timing structure is a slot, and/or that the transmission timing structure of reception is a slot. The first transmission timing structure may be the same or different from the transmission timing structure of reception.

The starting symbol may be determined in relation to a timing structure grid, and/or in relation to a scheduled transmission timing structure like a slot or mini-slot.

Generally, the transmission timing structure indication may be transmitted as control signaling, e.g. in a control channel, in particular a physical control channel. The control signaling may be downlink signaling or sidelink signaling, and/or the control channel may be a downlink channel like a (P)DCCH (Physical Downlink Control CHannel) or sidelink channel like a (P)SCCH (Physical Sidelink Control CHannel).

A border symbol may generally represent a starting symbol for transmitting or an ending symbol for receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

In some variants a starting symbol and ending symbol are in the same transmission timing structure. In some other variants, the starting symbol may be shifted to a succeeding transmission timing structure (e.g., in a grid). A starting symbol may generally be later in time than an ending symbol it is associated to.

The transmission timing structure indication may generally schedule the transmitting or receiving in a second transmission timing structure.

The transmission timing structure indication may in some variants be comprised in downlink control information or related signaling, in particular in DCI signaling or a related message.

There is also discussed a program product comprising instructions causing processing circuitry to control and/or perform a method as described herein.

Moreover, a carrier medium arrangement carrying and/or storing a program product as described herein may be considered.

The approaches described herein may be considered to implicitly indicate a border symbol for transmitting or receiving signaling, e.g. on one of the described channels, when indicating a transmission timing structure scheduling the signaling. Depending on the scheduled transmission timing structure, different symbol positions may be determined for the border symbol, e.g. in relation to the scheduled transmission timing structure, and/or in relation to an (e.g., underlying or synchronisation) timing grid. Accordingly, overhead is reduced, and flexible scheduling for transmission of signaling is enabled, in particular for quick response signaling (e.g., acknowledgement signaling), which may be particularly beneficial in the context of low latency applications. It may be assumed that both sides of the communication are aware of these approaches if implemented, allowing this implicit signaling approach.

A transmission timing structure indication or slot indication may generally be an acknowledgment resource indication, e.g. an ARI. It may comprise, or comprise of, a number of bits, e.g. 2 or 3 or 4 bits, which may indicate a shift in units of transmission timing structures (e.g., slots) between the transmission timing structure of reception of the transmission timing structure indication, and the scheduled transmission timing structure, e.g. the first transmission timing structure. The shift may in some variants in a range of 0 to 3 or 4 units, in some other up to 5 or more, e.g. for low-latency or Machine-Type-Communication applications.

BRIEF DESCRIPTION OF THE DRAWINGS

The drawings are provided to illustrate concepts and approaches described herein, and are not intended to limit their scope. The drawings comprise.

DETAILED DESCRIPTION

Figure 1:
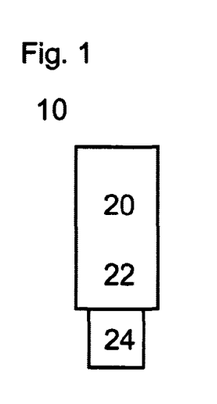
FIG. 1, showing an exemplary radio node like a user equipment.

FIG. 1 schematically shows a radio node or terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a transmitting module or receiving module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules.

Figure 2:
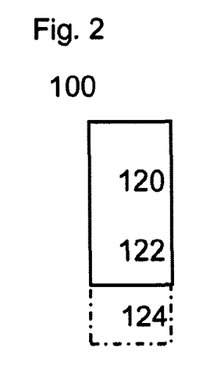
FIG. 2, showing an exemplary radio node like a network node.

FIG. 2 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna 124 circuitry may be connected to and/or comprise an antenna array. The node 100, respectively its circuitry, may be adapted to perform any of the methods of operating a network node or a radio node as described herein.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot. A transmission timing structure may cover a time interval of a specific length, which may be dependent on symbol time length and/or cyclic prefix used. A transmission timing structure may pertain to and/or cover a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them.

A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more symbols and/or signals and/or messages. A signal may comprise one or more bits. An indication may represent signaling, and/or be implemented as a signal, or as a plurality of signals. One or more signals may be included in and/or represented by a message. Signaling, in particular control signaling or acknowledgement signaling, may comprise a plurality of signals and/or messages, which may be transmitted on different carriers and/or be associated to different acknowledgement signaling processes, e.g. representing and/or pertaining to one or more such processes and/or corresponding acknowledgement information. An indication, may comprise signaling and/or a plurality of signals and/or messages and/or may be comprised therein, which may be transmitted on different carriers and/or be associated to different acknowledgement signaling processes, e.g. representing and/or pertaining to one or more such processes.

Uplink or sidelink signaling may be OFDMA (Orthogonal Frequency Division Multiple Access) or SC-FDMA (Single Carrier Frequency Division Multiple Access) signaling.

Downlink signaling may in particular be OFDMA signaling. However, signaling is not limited thereto (Filter-Bank based signaling may be considered one alternative).

Different formats of for control information or control signaling may be considered, e.g. different formats for a control channel like a Physical Uplink Control Channel (PUCCH). PUCCH may carry control information or corresponding control signaling, e.g. Uplink Control Information (UCI), which may comprise acknowledgement signaling like HARQ feedback (ACK/NACK), and/or Channel Quality Information (CQI), and/or Scheduling Request (SR). One of the supported PUCCH formats is short, and may e.g. occur at the end of a slot interval. Similar control information may be provided on a sidelink, e.g. as Sidelink Control Information (SCI), in particular on a (physical) sidelink control channel, like a (P)SCCH.

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or other node, in particular for a RAN as described herein.

The terms wireless device, user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM). Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary.

Transmitting in downlink may pertain to transmission from the network or network node to the terminal. Transmitting in uplink may pertain to transmission from the terminal to the network or network node. Transmitting in sidelink may pertain to (direct) transmission from on terminal to another. Uplink, downlink and sidelink (e.g., sidelink transmission and reception) may be considered communication directions.

Signaling may generally comprise one or more signals and/or one or more symbols. Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/ allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of uplink control information, may be transmitted by a terminal on a PUCCH (Physical Uplink Control Channel) and/or PUSCH (Physical Uplink Shared Channel) and/ or a HARQ-specific channel. Multiple channels may apply for multi-component/multi-carrier indication or signaling.

An acknowledgement signaling process may be a process of transmitting and/or retransmitting data (e.g., in the form of data elements), based on acknowledgement signaling, e.g. acknowledgement feedback like HARQ or ARQ feedback. Acknowledgement signaling may comprise and/or represent acknowledgement information, which may represent an acknowledgment or non-acknowledgement, e.g. of correct reception of the corresponding data or data element, and optionally may represent an indication of non-reception. In particular, acknowledgment information may represent ARQ (Automatic Repeat request) and/or HARQ (Hybrid Automatic Repeat reQuest) feedback. Correct reception may include correct decoding/demodulation, e.g. according to an ARQ or HARQ process, for example based on error detection and/or forward error correction coding, which may be based on a data element being received. Correspondingly, incorrect reception (non-acknowledgement) may refer to detection of an error during decoding/demodulating. Non-reception may indicate non-reception of a data element and/or non-reception of an acknowledgement position indication indicating a mapping pertaining to the data element. Non-reception may for example be indicated by a DTX (Discontinuous Transmission) indication. It should be noted that there may be DTX on either side of a communication. The radio node determining and/or transmitting the acknowledgement signaling may not receive an expected data element, and indicate this in the acknowledgement signaling as DTX, allowing more finely grained acknowledgment information. On the other hand, the radio node receiving acknowledgment signaling may not receive an expected acknowledgement signal, and treat this as a DTX event. Both kinds of DTX may be treated separately, e.g. as DTX1 and DTX2 or according to a different scheme. A data element in the context of acknowledgement signaling may in particular represent a data block like a transport block or code block, which may be subject to an acknowledgement signaling process, and one or more transmissions in the context of such a process.

A scheduling process (also referred to as resource requesting process) may be a process associated to scheduling resources, which in particular may be performed in a network node based on resource requesting information. Different scheduling processes may be operated separately, e.g. in parallel, e.g. pertaining to different terminals and/or data streams and/or radio bearers and/or priority levels. From a UE perspective, different scheduling processes, or requesting processes, may pertain to different data streams and/or channels (e.g., one or more control channels and one or more shared channels) and/or buffers, which for example may store/buffer information or data for transmission. A resource requesting process may request resources e.g., by transmitting resource requesting information. This may be triggered e.g. based on fill state of one or more buffers, and/or on detecting the presence of data to be transmitted, and/or based on an associated priority.

Control signaling may in particular be signaling on an uplink control channel, in particular PUCCH, or alternative on an uplink shared channel like PUSCH, for example for acknowledgement signaling or signaling in response to received signaling. However, in some variant acknowledgement signaling may be signaling on a sidelink and/or sidelink control channel, or on a downlink channel, in particular for signaling comprising the transmission timing structure indication.

Transmitting signaling, in particular control signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation.

Transmitting control signaling or acknowledgement signaling may be based on, and/or comprise, determining acknowledgement information, e.g. pertaining to one or more data elements or data streams. Determining such information may comprise performing an ARQ and/or HARQ process and/or determining correct reception of the data elements (and/or considering non-reception). Alternatively, or additionally, transmitting acknowledgement signaling may comprise and/or be based on receiving the data, respectively data elements, for example based on a configuration, which may be a downlink data configuration. Such a configuration may be configured by a network node. The configuration may (statically and/or dynamically, e.g. in part both) be valid for one, or more than one, time structure or TTI. However, in some cases, the configuration may be dynamically adapted for each time structure or TTI, e.g. as configured by a network node. Different acknowledgement signaling processes may be identified by different process labels or identifiers, e.g. HARQ process identifiers or sub-process identifiers.

Acknowledgement signaling may be considered pertaining to downlink data if it comprises acknowledgement information pertaining to downlink data respectively the data element's thereof. Downlink data may generally represent data transmitted on a downlink channel, e.g. subject to one or more ARQ or HARQ processes. A data element may in particular represent a (e.g., a single) data block (like a transport block), which may be associated to a specific ARQ/HARQ process. In particular, different data streams, respectively their data element/s, may be associated to different ARQ/HARQ processes (which may run in parallel).

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

Acknowledgement signaling may comprise and/or represent one or more bits (e.g., for ACK/NACK) for an acknowledgement signaling process, and/or comprise additional information, e.g. indicating that a data element was not received and/or scheduled (DTX).

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

Configuring a radio node, in particular a terminal or user equipment, may refer to the radio node being adapted or caused or set to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data.

Generally, configuring may include determining configuration data representing the configuration and providing it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink signaling, in particular acknowledgement signaling, and/or configuring resources and/or a resource pool therefor.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising microwave and/or millimeter and/or other frequencies, in particular between 100 MHz or 1 GHz, and 100 GHz or 20 or 10 GHz. Such communication may utilise one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of or associated to a symbol. Accordingly, different symbols may have different symbol time lengths.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. a LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Acknowledgement information may generally be represented by acknowledgment signaling, resource requesting information analogously by resource requesting signaling. Both kinds of signaling may be considered examples or parts of control signaling. Acknowledgment information may pertain to one or more acknowledgement signaling processes, which may be independent of each other. Resource requesting information may pertain to one or more resource requesting processes (or scheduling processes), which may be independent of each other.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be send over more than one carrier of an aggregate, e.g. one or more PCCs and one PCC and one or more SCCs.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While the following variants will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

Abbreviation Explanation

ACK Acknowledgment
ARI ACK/NACK Resource Indicator
CCE Control Channel Element
DCI Downlink Control Information
DL Downlink
DTX Discontinued Transmission
HARQ Hybrid Automatic Repeat Request
MIMO Multiple Input Multiple Output
NACK Negative Acknowledgment
OFDM Orthogonal Frequency Division Multiplexing
PAPR Peak to Average Power Ratio
PDCCH Physical Downlink Control Channel
PUCCH Physical Uplink Control Channel
RE Resource Element
RB Resource Block
RBG Resource Block Group
RRC Radio Resource Control
SC-FDM Single-Carrier Frequency Division Multiplexing
SL Sidelink
UE User Equipment
UL Uplink

The invention claimed is:

1. A method of operating a user equipment in a Radio Access Network, the method comprising transmitting signaling in a first transmission timing structure starting at a starting symbol, the starting symbol being determined based on a received transmission timing structure indication, the transmission timing structure indication indicating the first transmission timing structure; and
  if the first transmission timing structure is a transmission timing structure of reception of the transmission timing structure indication, the starting symbol is determined considering a processing timing and to be of a higher symbol number than if the first transmission timing structure is another transmission timing structure following, in time, the transmission timing structure of reception of the transmission timing structure indication.

2. The method according to claim 1, wherein at least one of the first transmission timing structure is a slot, and the transmission timing structure of reception is a slot.

3. The method according to claim 1, wherein the starting symbol is determined in relation to a timing structure grid.

4. The method according to claim 1, wherein a border symbol represents a starting symbol for transmitting or an ending symbol for receiving.

5. The method according to claim 1, wherein the transmission timing structure indication schedules the transmitting in a second transmission timing structure.

6. The method according to claim 1, wherein the transmission timing structure indication is comprised in downlink control information.

7. A method of operating a user equipment in a Radio Access Network, the method comprising determining a border symbol indicating a border of a transmission scheduled in a first transmission timing structure, the border symbol being determined based on a received transmission timing structure indication, the transmission timing structure indication indicating the first transmission timing structure, and transmitting or receiving signaling based on the determined border symbol; and
  if the first transmission timing structure is a transmission timing structure of reception of the transmission timing structure indication, the border symbol is determined considering a processing timing and to be of a higher symbol number than if the first transmission timing structure is another transmission timing structure following, in time, the transmission timing structure of reception of the transmission timing structure indication.

8. The method according to claim 7, wherein at least one of the first transmission timing structure is a slot, and the transmission timing structure of reception is a slot.

9. The method according to claim 7, wherein the starting symbol is determined in relation to a timing structure grid.

10. The method according to claim 7, wherein a border symbol represents a starting symbol for transmitting or an ending symbol for receiving.

11. The method according to claim 7, wherein the transmission timing structure indication schedules the transmitting or receiving in a second transmission timing structure.

12. The method according to claim 7, wherein the transmission timing structure indication is comprised in downlink control information.

13. A user equipment for a Radio Access Network, the user equipment being configured to transmit signaling in a first transmission timing structure starting at a starting symbol, the starting symbol being determined based on a received transmission timing structure indication, the transmission timing structure indication indicating the first transmission timing structure; and
- if the first transmission timing structure is a transmission timing structure of reception of the transmission timing structure indication, the starting symbol is determined considering a processing timing and to be of a higher symbol number than if the first transmission timing structure is another transmission timing structure following, in time, the transmission timing structure of reception of the transmission timing structure indication.

14. A user equipment for a Radio Access Network, the user equipment being configured to determine a border symbol indicating a border of a transmission scheduled in a first transmission timing structure, the border symbol being determined based on a received transmission timing structure indication, the transmission timing structure indication indicating the first transmission timing structure, and transmitting or receiving signaling based on the determined border symbol; and
- if the first transmission timing structure is a transmission timing structure of reception of the transmission timing structure indication, the starting symbol is determined considering a processing timing and to be of a higher symbol number than if the first transmission timing structure is another transmission timing structure following, in time, the transmission timing structure of reception of the transmission timing structure indication.

15. A method of operating a radio node in a Radio Access Network, the method comprising transmitting control signaling to a user equipment, the control signaling comprising a transmission timing structure indication, and receiving, from the user equipment, signaling transmitted in a first transmission timing structure starting at a starting symbol based on a transmission timing structure indication, the transmission timing structure indication indicating the first transmission timing structure; and
- if the first transmission timing structure is a transmission timing structure of reception of the transmission timing structure indication, the starting symbol is determined considering a processing timing and to be of a higher symbol number than if the first transmission timing structure is another transmission timing structure following, in time, the transmission timing structure of reception of the transmission timing structure indication.

16. A radio node for a Radio Access Network, the radio node being configured to transmit control signaling to a user equipment, the control signaling comprising a transmission timing structure indication, and receiving, from the user equipment, signaling transmitted in a first transmission timing structure starting at a starting symbol based on a transmission timing structure indication, the transmission timing structure indication indicating the first transmission timing structure; and
- if the first transmission timing structure is a transmission timing structure of reception of the transmission timing structure indication, the starting symbol is determined considering a processing timing and to be of a higher symbol number than if the first transmission timing structure is another transmission timing structure following, in time, the transmission timing structure of reception of the transmission timing structure indication.

* * * * *